Inventors:
Thos. A. Banning, Jr & Agnes J. Ranseen,
Executrix of estate of
Emil L. Ranseen, deceased.
by [illegible] Atty.

Note: Since rate of scan across the tape is constant during each scan the potential developed across the gap (ε or ε') varies proportionately to the strength of the magnetic field carried by the tape at each point of the path so scanned, during translation.

Inventors:
Thos. A. Banning, Jr. & Agnes J. Ranseen,
Executrix of estate of
Emil L. Ranseen, deceased.
by [signature] Atty.

Inventors:
Thos. A. Banning, Jr. & Agnes J. Ranseen, Executrix of estate of Emil L. Ranseen, deceased
by [signature] Atty.

Inventors:
Thos. A. Banning, Jr. & Agnes J. Ranseen,
Executrix of estate of
Emil L. Ranseen, deceased.
by [signature] Atty.

United States Patent Office 3,351,718

Patented Nov. 7, 1967

3,351,718

TRANSVERSE SCAN MAGNETIC RECORDING USING A CATHODE RAY TUBE RECORDING MEANS

Thomas A. Banning, Jr., 5500–5520 S. Shore Drive, Chicago, Ill. 60637, and Emil L. Ranseen, deceased, late of Chicago, Ill., by Agnes J. Ranseen, executrix, Evanston, Ill., assignors to Thomas A. Banning, Jr., Chicago, Ill.

Application Mar. 9, 1961, Ser. No. 94,651, now Patent No. 3,164,685, dated Jan. 5, 1965, which is a division of application Ser. No. 427,428, May 4, 1954, now Patent No. 2,976,354, dated Mar. 21, 1961. Divided and this application Dec. 18, 1964, Ser. No. 419,612

1 Claim. (Cl. 179—100.2)

This invention relates to improvements in recording and playing-back television and other programs, and the like.

This application is a division of our co-pending application for patent on Improvements in Wide Band Recording System, Ser. No. 94,651, filed Mar. 9, 1961, issued as Letters Patent No. 3,164,685, on Jan. 5, 1965; said application, Ser. No. 94,651 being a division of application, Ser. No. 427,428, for Improvements in Tape Recording and Translating, filed May 4, 1954, now Letters Patent No. 2,976,354, issued Mar. 21, 1961, filed by Thomas A. Banning, Jr., and Emil L. Ranseen, lately a citizen of the United States, residing at Chicago, Ill., now deceased, the executrix of whose estate is Agnes J. Ranseen.

This invention concerns itself with recording means constituted to record such programs as television programs, including both the video and the audio components of such programs; and means constituted to enable playback of such programs, including both of the video and the audio components, to conventional television receivers. In this connection provision is made in the hereinafter to be disclosed embodiments, for producing the video recordings (which record the video signals of variations within the magacycle/sec. range) by cross-scanning or wide-band recording operations, according to the principles disclosed in said Letters Patent No. 2,976,354, and divisions thereof. The tape speeds when using the operations hereinafter to be disclosed, and as shown in the said Letters Patent No. 2,976,354, may be of the order of 15 to 30 inches per second, thus making it possible to record a program of one or several hours' duration on a spool carried tape of reasonable and acceptable size. We have hereinafter disclosed the recording of the audio program elements corresponding to such video program recording operations, according to cross-scanning recording operations. In this case the cross-scanned audio programs may be conveniently recorded as audio frequency recordings, made as superimpositions on any cross-scanning records of video element recordings.

Under present specifications of the FCC the horizontal deflections of the electron scanning beam of the kinescope of the television receiver are produced at the rate of 15,750 scans per second. When there is produced one cross-scan corresponding to each horizontal deflection of the kinescope beam there will be recorded 15,750 cross-scans of the wide band recording per second. With a spacing of two mils between successive cross-scans recorded, it is possible to accommodate 500 such cross-scans per inch of tape length; and accordingly, a tape speed of 31½ in./sec. will be sufficient to produce the desired recording.

Since the conventional television receiver includes means to produce both the horizontal deflections and the vertical deflections of the electron beam of the kinescope (conventionally by means of "Saw-Tooth" generators), it is possible to make use of such deflection producing means of the television receiver for also producing the cross-scans of the recording system, and, thereafter, for producing the cross-scans of the sensing means by which such recorded cross-scans are sensed to actuating the desired scan producing structures of the television receiver. However, as herein illustrated and described, deflection producing means for the electron beam of the scan producing unit may be provided which is individual to the recording and playing-back operations, making possible the operations hereinafter disclosed without any operative connection to a television receiver. At this point we call attention to the fact that the recording and sensing equipment hereinafter to be disclosed includes means to produce the cross-scans by use of a conventional electron beam system, including a target of material which, when excited by the impact of such electron beam, produces a light emitting spot on the target, together with the conventional horizontal deflection producing yoke acting on the beam to produce such horizontal deflections. Since the electron beam of such record producing and sensing arrangement need produce only the horizontal deflections, it is possible to produce such recorder or sensor horizontal deflections by a simple horizontal deflection producing means individual to such recorder. We have accordingly included in the presently to be disclosed structures, connections and means constituted to cause variation of the electron beam strength of the electron recording unit during the recording operation. Thus the strengths of successive signals produced on the tape (or variations of the strength of the continuous signal produced on the tape), shall correspond at all times to the varying strength of the electron beam in the kinescope, and thus shall also correspond at all times to the strength of the audio signals delivered to the electron gun of the recorder.

Other objects and uses of the invention will appear from a detailed description of the same, which consists in the features of construction and combinations of parts hereinafter described and claimed.

In the drawings:

FIGURE 1 shows a face view of a section of signal recording tape having recorded thereon a series of cross-scanned signal recordings; together with regularly located synchronizing signal recordings, placed on the tape during the recording operations, and corresponding to re-setting of the electron beam to its starting position at completion of each cross-scan, which so recorded signals are to be used during sensing and translation of the program;

FIGURE 2 shows a view corresponding to that of FIGURE 1; but in FIGURE 2 there is shown an electronic deflectable beam scanning unit in place with respect to such tape section, and usable to sense and translate recorded audio signals carried by such tape, with use of lateral deflections of the electron beam of such sensing unit corresponding to each of the cross-scans; such cross-scanning means being fully disclosed in the parent application, Ser. No. 427,428, Patent No. 2,976,354, and in one or more divisional applications based on said parent application and patent;

FIGURE 3 shows a view similar to that of FIGURE 2; but in the showing of FIGURE 3 there are included two such deflectable beam cross-scanning units, in series alignment along the tape, one such unit constituting a video signal recording and/or sensing and translating unit, and the other such unit constituting an audio signal sensing and translating unit;

FIGURE 4 shows a fragmentary plan view corresponding to a portion of either of FIGURES 2 or 3; and FIGURE 4 also shows a pair of conductors extending across the record carrying width of the tape, and separated by a narrow air-gap, to be used during recording and translating operations, according to various of the disclosures of such parent application and patent; and FIGURE 4 also shows, schematically, a simple form of circuitry for use in connection with such recording operations;

Figure 4:
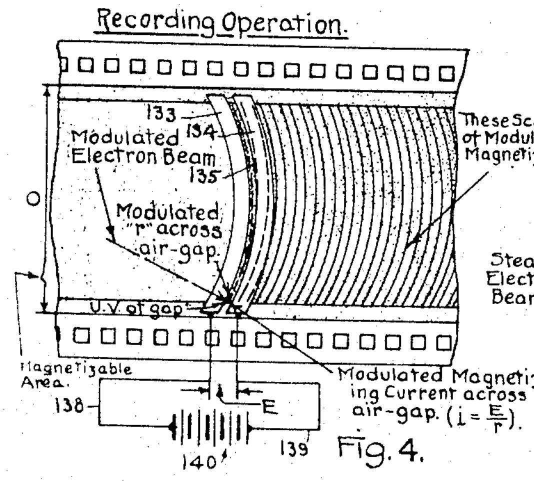
Figure 6:
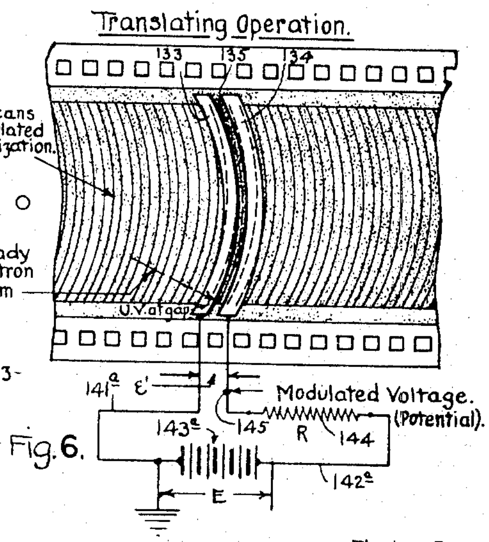
FIGURE 6 shows a view similar to that of FIGURE 5; but FIGURE 6 shows, schematically, another simple form of circuitry for sensing and translating the previously recorded signals.
Figure 5:
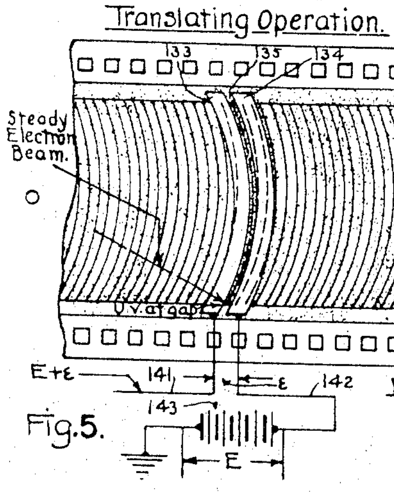
FIGURE 5 shows a view similar to that of FIGURE 4; but FIGURE 5 shows, schematically, a simple form of circuitry which may be used for sensing and translating signals carried by the tape.
Figures 7, 8:
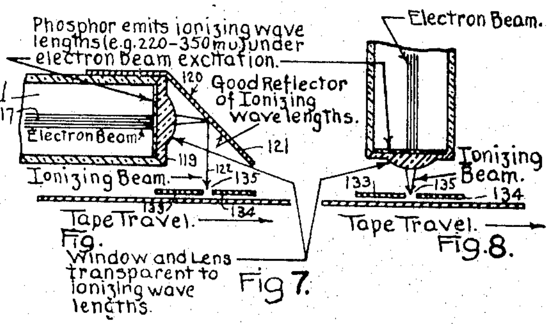
Figure 9:
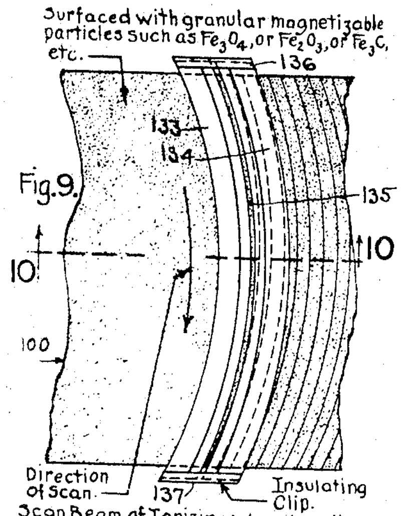
Figure 10:
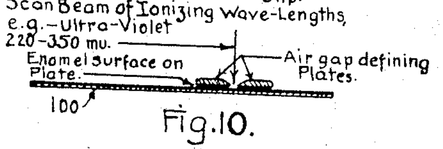
Figures 14, 15:
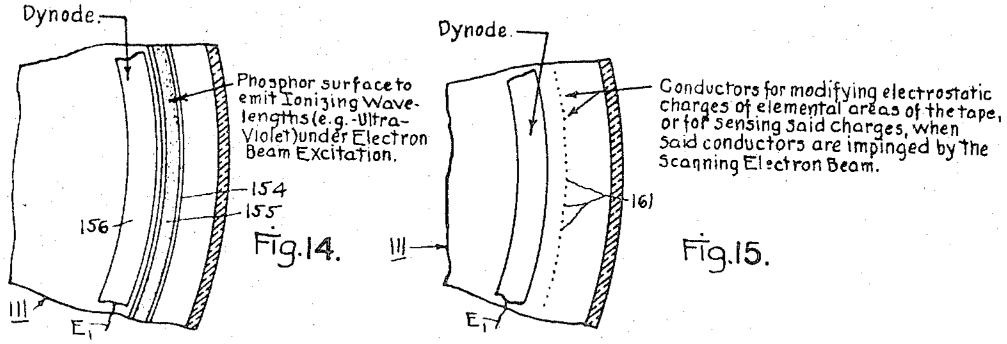
Figures 11, 12, 13:
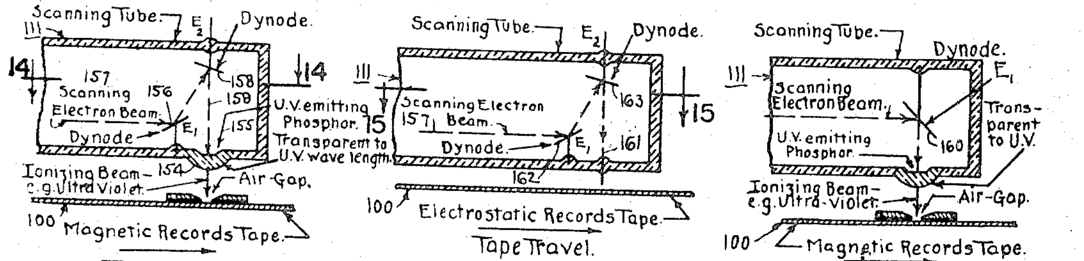
Figure 16:
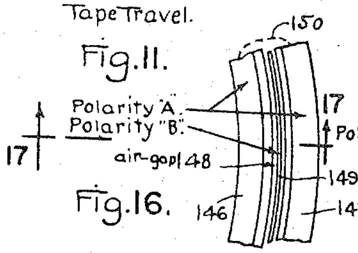
Figure 17:
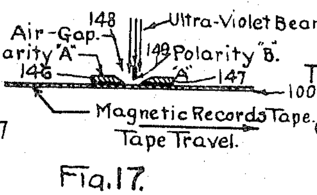
Figure 18:
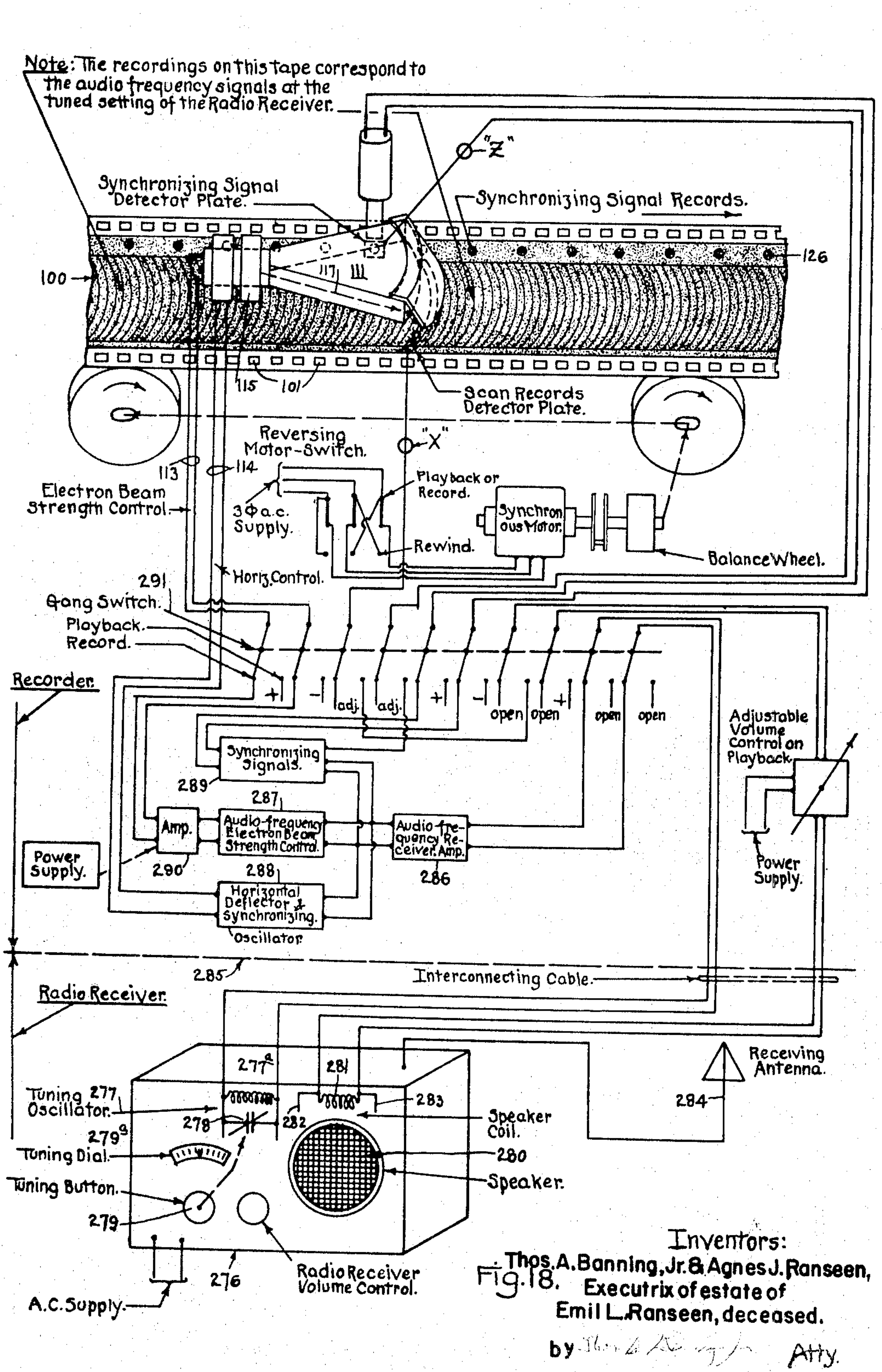

FIGURE 7 shows a fragmentary vertical section through the end portion of the deflectable beam scanning unit of previous figures of this case; and this figure shows the window in the end of the envelopes, and transparent to ionizing wave lengths, together with the target surface of phosphor which is constituted to produce such ionizing wave lengths under electron beam excitation, for direct passage through the window of the envelope, to the exterior of such envelope; together with a reflector outside of the envelope, constituted to receive the ionizing wave lengths beam emerging from the window, and deflect such beam directly down towards the tape surface; together with the two conductor arrangement establishing the narrow air-gap which is ionized at an elemental area to produce conductivity between such two conductors;

FIGURE 8 shows a view similar to that of FIGURE 7; but in FIGURE 8 the electron beam extends in vertical direction so that it impacts the phosphor surface directly, and so that the so-produced ionizing wave-lengths beam may be transmitted directly through the window, and to the air-gap without need of direction change produced by reflecting means;

FIGURE 9 shows another fragmentary view similar to that of FIGURE 4, but without the circuitry of FIGURE 4; and FIGURE 9 shows how the two conductors which produce the air-gap between them are connected together at their ends, by insulating clips, connected to the end portion of the envelope, or to other suitable supporting means;

FIGURE 10 shows a fragmentary vertical section, taken on the line 10—10 of FIGURE 9, looking in the direction of the arrows;

FIGURE 11 shows a fragmentary vertical section through the end portion of the scanning unit of form embodying the window in its lower wall, facing towards the translating conductors; and in this embodiment there are provided two dynodes, one in the path of the beam from the beam source (such as the gun), set to reflect the beam upwardly at an angle, and at the same time to amplify the beam by secondary emission, and the other located between such first dynode and the phosphor surface, and set at an angle to reflect the firstly amplified beam towards such phosphor surface, with further amplification by secondary emission;

FIGURE 12 shows a view similar to that of FIGURE 11; but in the present embodiment the window of material transparent to ionizing wave-lengths has been superseded by an arrangement embodying a series of small conductors extending through the wall of the envelope, and set at positions such that their inner ends are impacted by the two dynode amplified electron beam during its scan, the outer ends of such conductors being located close to the surface of the tape whereon the recordings are to be made, to produce the desired recordings on such surface;

FIGURE 13 shows another view similar to that of FIGURE 11; but in the present embodiment there is included only one dynode set to reflect the electron beam directly to the phosphor surface, with amplification of such beam by secondary emission;

FIGURE 14 shows a horizontal section taken on the line 14—14 of FIGURE 11; looking in the direction of the arrows;

FIGURE 15 shows a horizontal section taken on the line 15—15 of FIGURE 12, looking in the direction of the arrows;

FIGURE 16 shows a fragmentary detail of another embodiment of the conductors and air-gap arrangement for producing a force which may be used for producing the recordings by magnetic effects on the magnetizable surface of a tape, or for sensing and translating magnetic recordings carried by such tape; and in this embodiment of such conductors there is provided a third conductor between the two outside conductors, for producing a bi-polar recording on the tape or for sensing the recordings carried by such tape;

FIGURE 17 shows a fragmentary vertical section taken on the line 17—17 of FIGURE 16, looking in the direction of the arrows; and FIGURE 18 shows, more or less schematically, a simple arrangement embodying the cross-scanning recording means, for enabling the recording of only that selected program which is at the time of such recording, tuned for reception and translation in the conventional way by a radio receiver; and with suitable switching means of simple form to enable play-back of such so-recorded program, having previously produced necessary rewind of the tape of the recorder; and in this showing there is also included suitable deflection control means and saw-tooth generating means, and synchronizing means, as a portion of the recorder itself, to enable and effect the necessary controls of the operation of the recorder elements.

Figure 1:
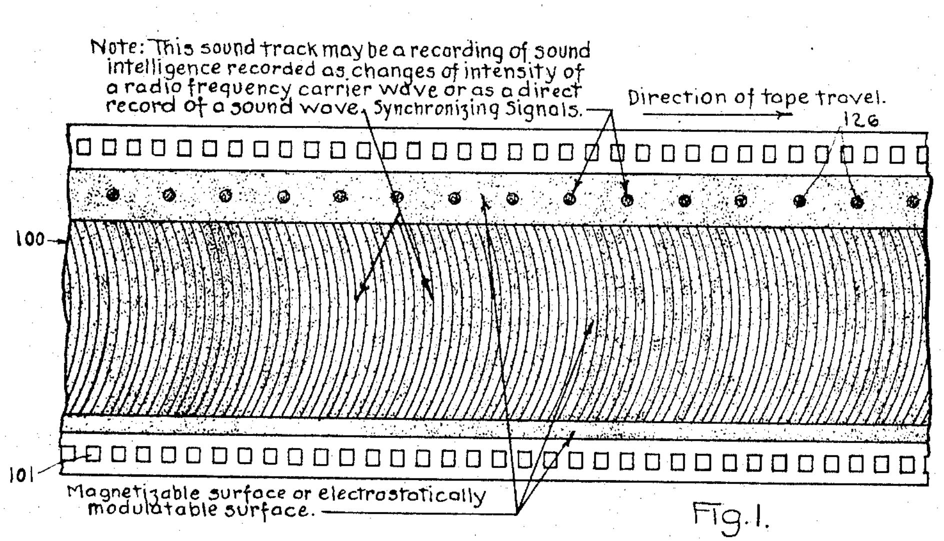
Figure 2:
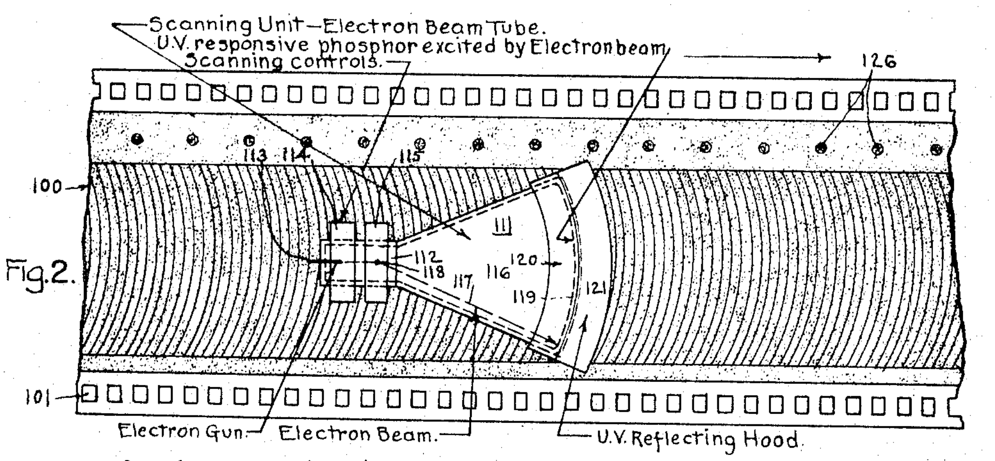
Figure 3:
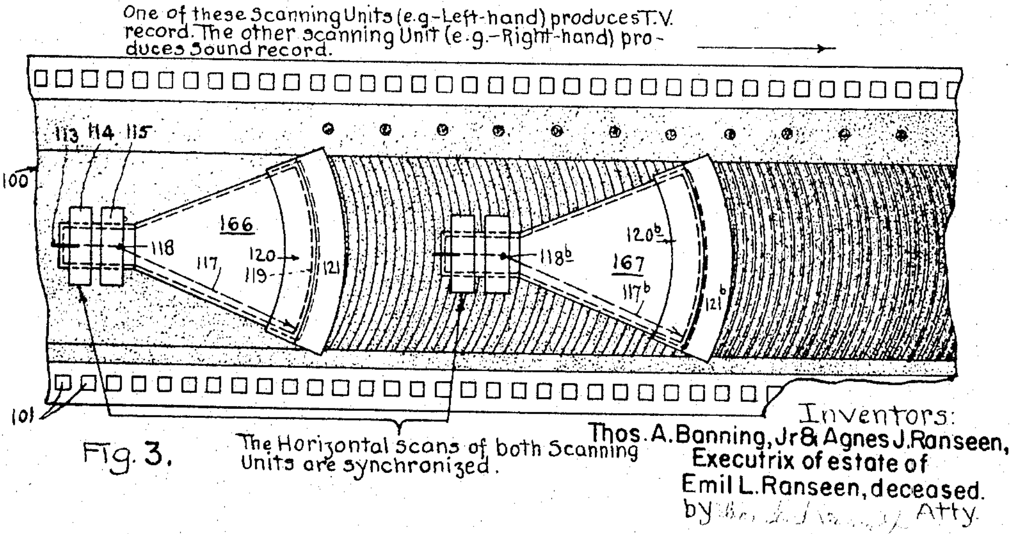

In each of FIGURES 2 and 3, there is shown a cross-scanning unit 111 (two being shown in FIGURE 3, designated 166 and 167), mounted in place with respect to a record receiving and carrying tape 100; and in FIGURE 18, there are shown schematically, means to drive such tape in conventional or suitable manner. In each of such figures also, numerous cross-scans are indicated by the curved crosswise extending lines which designate locations at which the cross-scans have been or may be produced or sensed by the unit 166, or 167, as the case may be. Each such scanning unit is shown as including means to produce an electron beam within the envelope of such unit, means to produce lateral deflections or swings of such beam, and means to produce exterior to the envelope of such unit, a scanning force whose strength is proportional to the strength of the beam within the envelope, and whose cross-scanning operation is produced in exact synchronism with the deflections of the beam within the envelope. Means are also shown for translating such scanning force into a corresponding record on the tape, during a recording operation, and for sensing and translating previously recorded signals carried by such tape, with sensing of the scans corresponding to the sequence under which they were recorded.

Various details of such scanning units are shown in FIGURES 7, 8, 9 and 10, and 11 to 17, inclusive. These figures also include showings of alternative embodiments of details. Included in such details are means to produce the lateral or horizontal deflections of the beam, means to deliver to the beam potentials proportional to the strengths of the signals to be recorded, alternative embodiments of means to translate the beam strength emitted within the envelope, and the lateral scans of such primary beam within the envelope, into forces outside of the envelope of strength proportional to the strength of the beam within the envelope, and to cause such so-produced forces to execute the lateral scans in exact harmony and synchronism with the lateral deflections of the beam within the envelope. Such details also include alternative disclosures of means to translate such outside forces into recordings on the tape, either as magnetic recordings, or as electro-static force recordings. Said details also include showings of means to translate the forces outside of the envelope by sensing means to enable play-back of recorded signals carried by the tape. Various other details of such showings are also included in said figures. These include means to amplify the strength of the beam or of the outside force which corresponds to such beam. Various other disclosures are also included in said figures. Since all such showings and disclosures are fully set out in said parent application, Ser. No. 427,428, Letters Patent No. 2,976,354, it is not deemed necessary to repeat a description of such details of construction, and principles of operation here. However, certain of such details of construction and operation will be referred to hereinafter during description and consideration of FIGURE 18. Several of these figures disclose novel operations and translations which may be produced by use of various of the features of such scanning units or other scanning units. Accordingly, reference is now made to FIGURE 18 as follows:

The arrangement shown in FIGURE 18 of this case differs from that shown in FIGURE 20 of application, Ser. No. 94,651 (Letters Patent No. 3,164,685, Jan. 5, 1965) principally in this; that while the arrangement of such FIGURE 20 of such parent case is intended for the recording of radio frequency signals, with provision for afterwards sensing and playing-back such radio frequency signals to the antenna input connection of a conventional radio or audio receiver, there to enable the operator of such receiver to select that program which he may wish to have played on such receiver; in the arrangement shown in FIGURE 18 hereof, the recordings are of the audio frequency and modulated signals of an audio program selected from the various programs which may, at the time, be "on the air," and the playing-back of such recorded signals will be a playing of that particular program which was originally selected by the tuning of the receiver according to conventional operations.

In the arrangement shown in FIGURE 18 hereof, the radio receiver 276 is provided with the conventional tuning button 279 for tuning to the selected radio frequency of the desired station (sending station); and there is shown, schematically, such a frequency tuning arrangement in the form of the oscillator 277 including the fixed inductance 277$^a$ and the variable capacitance 278 across such inductance, such variable capacitance being operated by use of the tuning button 279 according to conventional practice at this time. The dial 279$^a$ is provided for indicating the tuned station, also according to conventional practice. The speaker 280 is also shown, together with its coil 281, and connections 282 and 283 are provided for delivering the audio frequency of the selected program, to such speaker. Thus the lines connected to the connections 282 and 283 carry the audio frequency signals which correspond to the tuned radio frequency input, for delivery of such audio frequency signals to the recorder. The arrangement shown in this figure thus includes means to make a tape recording of the audio signals corresponding to the radio input frequency tuned by the conventional tuner. When any other radio frequency is tuned, corresponding to some other sending station, the audio signals corresponding to the radio frequency now tuned will be then delivered over the connections 282 and 283 will be sent to the recorder for recording.

With a recording of the kind just described it is evident that play-back of the recorded program may be effected by delivering to the speaker lines 282 and 283, signals produced by sensing the record carried by the tape from the previous recording. It is also noted that during such playing-back the antenna of the radio receiver is disconnected from such receiver; or, alternately, the speaker coil and connections 282 and 283 may be disconnected from the receiver circuits, other than the audio amplifying elements. Since many forms of audio receiver circuits are well known and widely used it is not deemed necessary to further disclose any particular circuitry herein.

The line 285 shows schematically, the division point between those elements comprising portions of the receiver, and those, above such line, comprising portions of the recorder. The recorder then shown includes the audio frequency receiver element 286, the audio frequency electron beam strength control unit 287, the horizontal deflector and synchronizing unit 288, the synchronizing control unit 289, and the amplifier for electron beam strength control unit 290, when needed.

The ten blades, double throw switch 291 is provided in the recorder unit, which when thrown to its left-hand position as indicated in FIGURE 18, produces the needed connections for recording the audio waves then being produced by the radio receiver at its then tuned position, being the program then being played; and which switch, when thrown to its right-hand position, produces the needed connections for playing-back such audio wave recorded program to the speaker unit of the radio receiver. It is emphasized that with the present arrangement of FIGURE 18, there is being produced directly a recording of audio waves at their audio frequencies, on the tape record, and there are played back, by the cross-scanning principle, or otherwise, such recordings.

However, in the embodiment of FIGURE 18, wherein the recording and playing-back of audio programs is disclosed (by cross-scanning operations), the receiver does not, in itself, include any synchronizing pulse generator or corresponding unit, by which the cross-scans of the recorder may be controlled, through control of the horizontal deflection producing means of such recorder. Accordingly, in the embodiment of such FIGURE 18 a pulse generator is disclosed as an element of the recorder itself (unit 289, titled "Synchronizing Signals"), thus making such recorder completely self-contained and capable of producing (or sensing) cross-scans at the rate determined by such unit 289.

By the use of cross-scanning of the audio frequency signals, the following advantages, among others, are noted:

By such operations extremely fine and faithful audio recordings may be produced since the total length of line scanned during each second is very large. For example, when scanning 15,750 lines or scans per second, according to requirements of presently in force rules of the FCC, and with a scanned tape width of 1½ inches, it is evident that the total length of scanned line per second will be 23,625 inches per second (being 15,750 times 1½ inches). If the recorded sound waves are of the frequency of 15,000 per second (very high), still each such wave will extend over more than a full scan length, extending from one scan into another. For lower frequencies and pitches of sound, the successive waves will extend, in some cases over many successive scans. Thus, due to the length of record possible for each such wave it is possible to secure a recording thereof which will include substantially all of the minute variations of sound intensity contained in such wave; and also it is possible to secure faithful recordings of frequencies and variations beyond any possible means of recording now conventionally known or used. Thus, we include within the purview of our present invention also the recording and interpretation and sensing of sound or other signals, as well as those included within the usual terminology of wave variations.

Since the audio frequency signals of a sound track produced by use of the cross scans generally will be not more than one wave of sound per scan, and would usually extend over several or many scans, it is seen that if desired, such audio frequency sound recordings may be effected by cross scans superimposed on the cross scans produced for a television or other high frequency signal variation recording; and with proper tuning equipment, including for example proper sound trap arrangements for dividing the signals for subsequent sensing and interpreting operations. By thus superimposing the sound track cross scans on the high frequency signals it would not only be possible to make use of the very great accuracy of the sound recordings, but would also be possible to reduce the overall width of the tape by that amount otherwise assigned to the linear sound track. We have herein shown such as arrangement in FIGURE 3.

It is to be noted that during the process of recording the cross scan sound track, each such cross scan is produced by the deflection signals arriving from the horizontal deflector and synchronizing unit 288, such unit being individual to the recorder since no television unit with its saw-tooth generator is present. The frequency of such horizontal deflections is determined by the circuitry thereof, which conventionally includes means to adjust such frequency. The frequency of arrival of the previously recorded cross scans of sound track, at the location of the sensing unit depends on the tape speed during playing-back. Accordingly, in order that the horizontal deflections produced by the electron beam of the unit 111 shall always coincide with arrival of successive previously recorded cross scans at the location of the sensing unit, the saw-tooth generator or other unit included in the element 288 must be adjusted according to the speed of the tape travel. During the recording operation the synchronizing signals from such unit 288 and the unit 289 were recorded along the tape, as shown by the dots 126 (FIGURE 18). Thus such dots were spaced apart distances equal to the tape travel between corresponding numbers of deflection signals which arrived from the units 288 and 289 during the recording now being sensed and translated. When the number of horizontal deflection signals produced by the units 288 and 289 is such that, during the playing-back, the production of a sensed signal from one of the recorded dots does not occur simultaneously with the completion of the prescribed number of horizontal deflection signals, the units 288 and 289 will effect correction to bring their rate of deflection signals into exact harmony with the arrivals of the signals delivered from the sensing of the dots 126. In the absence of such harmony, imperfect translation of the recorded sound scans will occur; and when such imperfection is more than very slight, the played-back program will not be satisfactory.

It is thus seen that, in the present disclosures we have made provision for effecting such corrections as above detailed, by the provision of the horizontal deflector and synchronizing unit, and the synchronizing signals unit, as parts of the recorder itself, instead of making use of such units comprising portions of the television circuitry.

We claim:

A radio receiver constituted to receive a carrier wave frequency which is modulated to correspond to audio intelligence, including audio frequency output connections; together with a recorder including means to drive a tape having a recording surface, at substantially uniform speed; a deflectable beam scanning head mounted in proximity to the recording surface of said tape, means to produce a deflectable beam of controlled strength with production of a force exterior to the scanning head and against the recording surface of the tape, the strength of the force exterior to the scanning head being proportional to the strength of the beam; beam lateral deflection signal producing means; means and connections under control of said lateral deflection signal producing means constituted to cause the beam to execute regularly timed lateral deflections across the recording width of the tape with production of recorded cross scans of strength varying according to the variations of the strength of the beam, on the recording surface of the tape; connections between the audio frequency output connections of the receiver and the beam producing means constituted to cause the beam strength to vary proportionately to the strength of the audio frequency output; means to produce a synchronizing signal corresponding to each group of a predetermined number of lateral deflection signals; means proximate to the tape constituted to produce synchronizing signals records on the tape; and connections and means constituted to cause said synchronizing record producing means to produce a synchronizing record on the tape corresponding to each synchronizing signal; together with a speaker element; together with means and connections between the audio output connections, and the speaker, constituted to cause the speaker to function according to the strengths of the audio frequency signals; and together with two position switching means having a first defined recording position and a second defined playing-back position; together with a scanning detector plate in proximity to the tape surface at the location of the scanning head, and a synchronizing signal detector plate in proximity to the tape at the location of the synchronizing signal record producing means, and a source of substantially constant potential; connections to the scanning detector plate and connections to the synchronizing signal detector plate; the connections to all said units and the switching means being constituted such that when the swtiching means is in the first defined recording position the means to produce the controlled strength of the beam of the scanning head is connected to the audio signal output connections, and the lateral deflection signal producing means is connected to the scanning head, the synchronizing signal producing means is connected to the synchronizing signal recording means; and said connections to all said units and to the switching means, being constituted such that when the switching means is in the second defined playing-back position, the means to connect the controlled strength of the beam of the scanning head to the audio signal output connection is inoperative, and said controlled beam strength means is connected to the source of constant potential, the connections of the synchronizing signal producing means to the synchronizing signal record producing means is inoperative, and said synchronizing signal record producing means is connected to the source of constant potential; and the connections of the scanning detector plate are connected to the speaker; and the connections of the synchronizing signal detector plate are connected to the beam lateral deflection producing means.

References Cited

UNITED STATES PATENTS

| | | | |
|---|---|---|---|
| 2,291,476 | 7/1942 | Kernkamp. | |
| 2,326,332 | 8/1943 | Clausen. | |
| 2,572,157 | 10/1951 | Kay | 179—100.11 |
| 2,681,382 | 6/1954 | Hilburn. | |
| 2,698,928 | 1/1955 | Pulvari. | |
| 2,857,458 | 10/1958 | Sziklai | 178—6.6 |
| 2,900,443 | 8/1959 | Camras | 178—6.6 |
| 2,933,555 | 4/1960 | Wootten | 179—100.2 X |
| 3,020,356 | 2/1962 | Barry | 179—100.2 |

BERNARD KONICK, *Primary Examiner.*

DAVID G. REDINBAUGH, *Examiner.*

H. W. BRITTON, P. ROTH, *Assistant Examiners.*